L. B. TYNG.

Turning Lathe.

No. 10,602.

Patented March 7, 1854.

UNITED STATES PATENT OFFICE.

L. B. TYNG, OF LOWELL, MASSACHUSETTS.

TAIL-STOCK FOR TURNING-LATHES.

Specification of Letters Patent No. 10,602, dated March 7, 1854.

*To all whom it may concern:*

Be it known that I, LEVI B. TYNG, of the city of Lowell, county of Middlesex, and State of Massachusetts, have invented a new and useful Improvement in the Construction of "Tail-Stocks," technically so called, of Turning-Lathes; and I do hereby declare that the following is a full, clear, and exact description of the construction, application, and operation of the same, reference being had to the annexed drawings, which form a part of this specification, in which—

Figure 1:
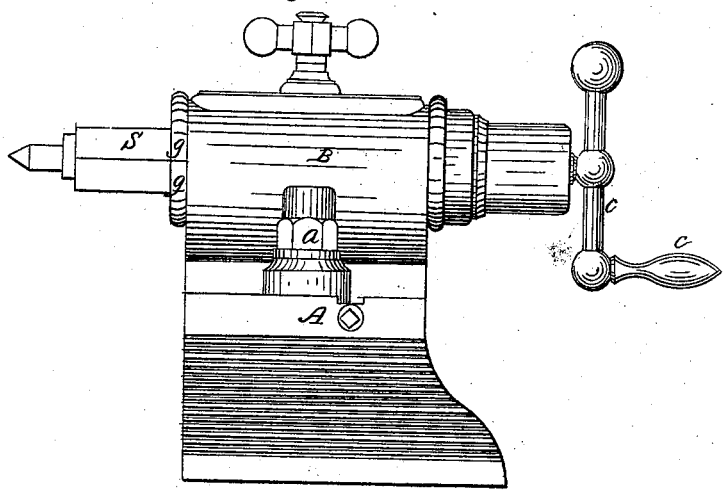
Figure 2:
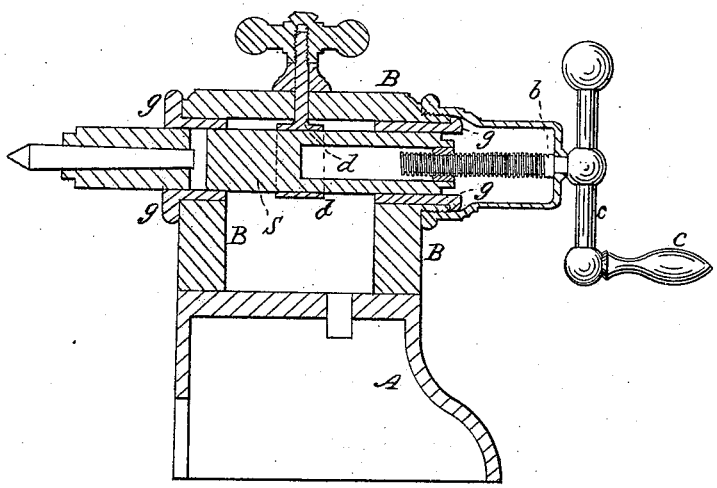
Figure 3:
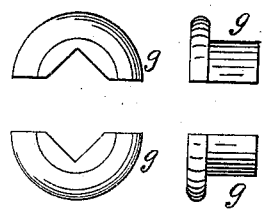

Figure 1 exhibits a side view, and Fig. 2, a vertical, longitudinal section of a tail stock of an engine lathe, containing the herein specified improvement. Fig. 3 represents, as detached from the tail stock, the guide boxes for the spindle, constituting, in themselves and in the method of their application, the improvement claimed.

The same letters refer to the same parts in all of the drawings.

The essential features exhibited in the drawings, with the exception of the improved parts, may be readily identified by reference to any engine lathe of ordinary construction;—(A) being the lower portion of the tail stock, movable at pleasure along the bed of the lathe;—(B) the upper portion, capable of adjustment in the common manner upon the part (A), so as to turn objects of the same diameter from end to end, or of an uniform taper, or cone. This portion is secured to the part (A) by bolts the tightening nut of one of which is seen at (*a*).

(S) is the spindle of the tail stock, movable at pleasure in the direction of its own axis, by the screw (*b*) turned by the handle (*c*). The spindle is retained at any point, within the limits of this movement, by the clamp and screw (*d*) acting in the usual manner.

That part of the upper portion, (B), of the tail stock which is destined for the reception of the spindle (S), is bored, in the direction of the axis of the spindle, at each end, for the insertion of a divisional guide box (*g*), (*g*), (*g*), (*g*), of cast iron or other metal, and adapted for a round or square spindle, whichever may be used. The separate halves of these boxes are planed or bored internally, according as they may be required for spindles of a round or square section, and are planed on their edges, by one and the same operation, and are then clamped together in pairs, and ground to a finished surface on the spindle. Being still secured around the spindle, they are turned upon their outsides, so as to enter and entirely fill the diameter of recesses bored out of the part (B), and as far as the shoulder formed by the inward side of the circular flange of each box. The closeness of their pit retains them in their places.

One box may be fitted first, within one end of the part (B); the spindle may then be inserted, and the halves of the remaining box be put together around it; and they may then be entered and fitted in the part (B) by the guidance of the spindle, so as to insure the same direction of their internal sides with those of the box first fitted.

The guide boxes may be of a greater length than that of the bearings practically obtained by fitting the spindle in contact with the part (B), and will therefore distribute the wear, due to the friction of the spindle when in motion, over an extended surface, and reduce its amount on any single point. This method of forming the guides for the spindle is dependent on the use of self operating tools, and does not involve the liability of inaccuracy in fitting with hand tools. It is a more direct and reliable method than the one commonly in use, and insures greater accuracy in the construction of the parts to which it applies.

What I claim as my invention and desire to secure by Letters Patent, is—

Constructing and applying guide boxes substantially as herein described to the tail stocks of lathes which make a better, cheaper and far more durable bearing than those made heretofore for such purposes.

Lowell January 5, 1853.

LEVI B. TYNG.

Witnesses:
M. G. HOWE,
D. J. MURPHY.